June 30, 1964 G. SLAYTER ETAL 3,139,332
GLASS MELTING APPARATUS
Original Filed Dec. 21, 1955 7 Sheets-Sheet 1
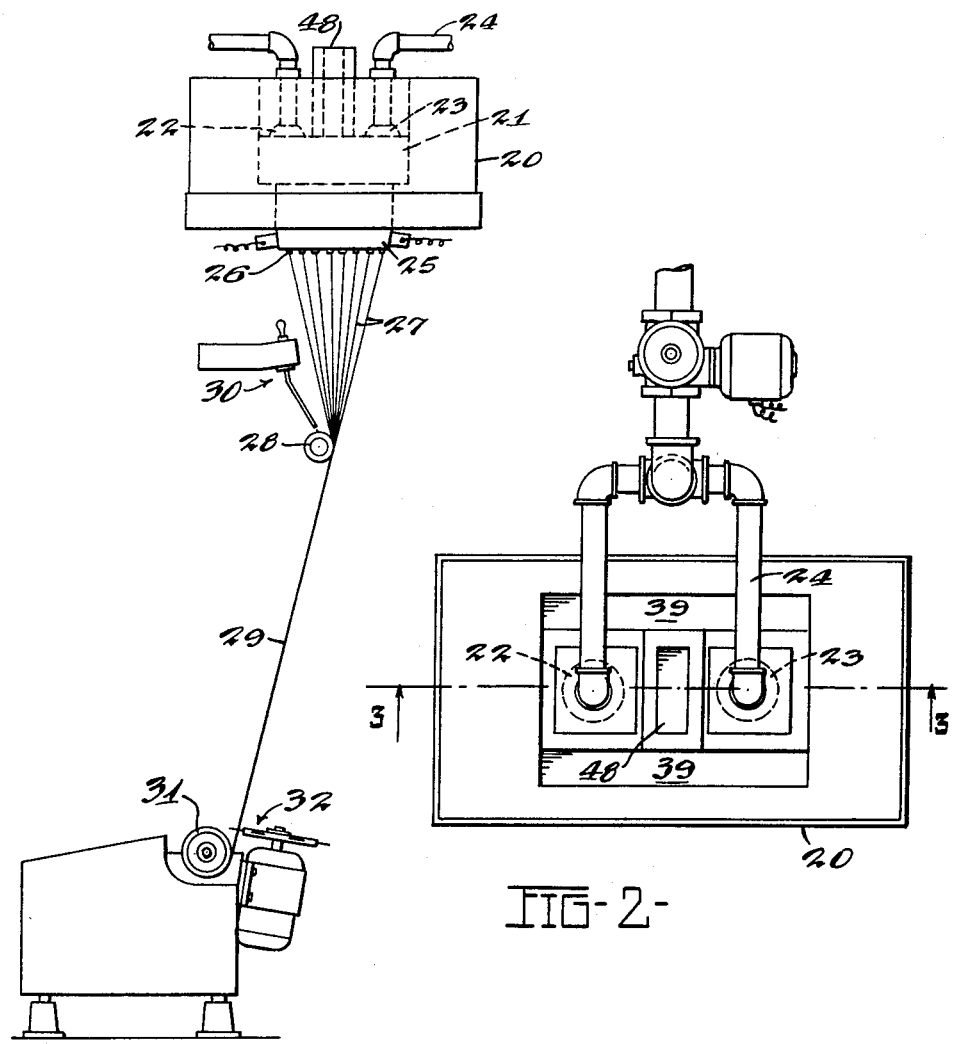
FIG-1-
FIG-2-
INVENTORS:
GAMES SLAYTER & ED FLETCHER.
BY
Staelin & Overman
ATTORNEYS.

June 30, 1964 G. SLAYTER ETAL 3,139,332
GLASS MELTING APPARATUS
Original Filed Dec. 21, 1955 7 Sheets-Sheet 2
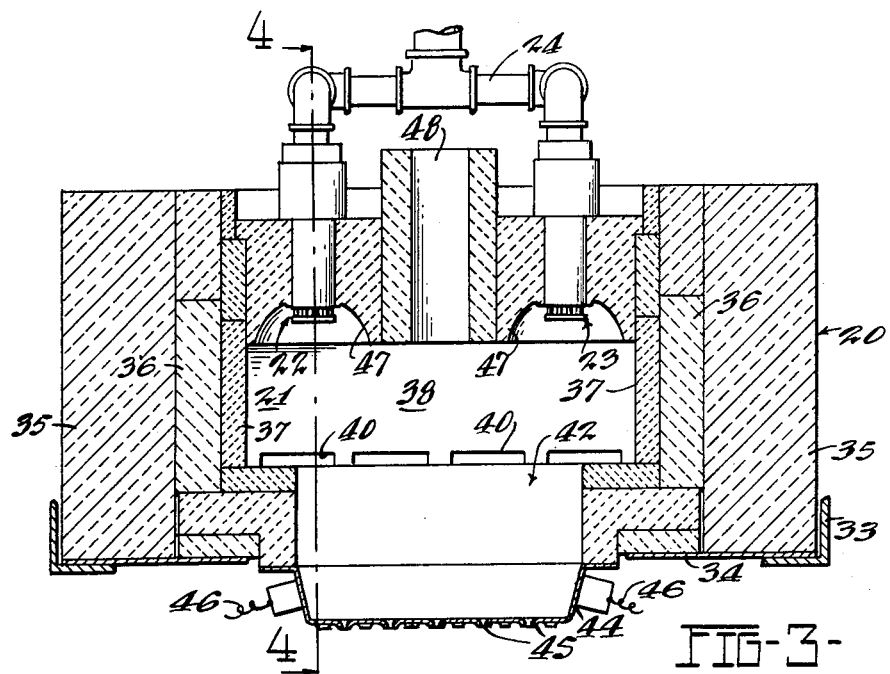
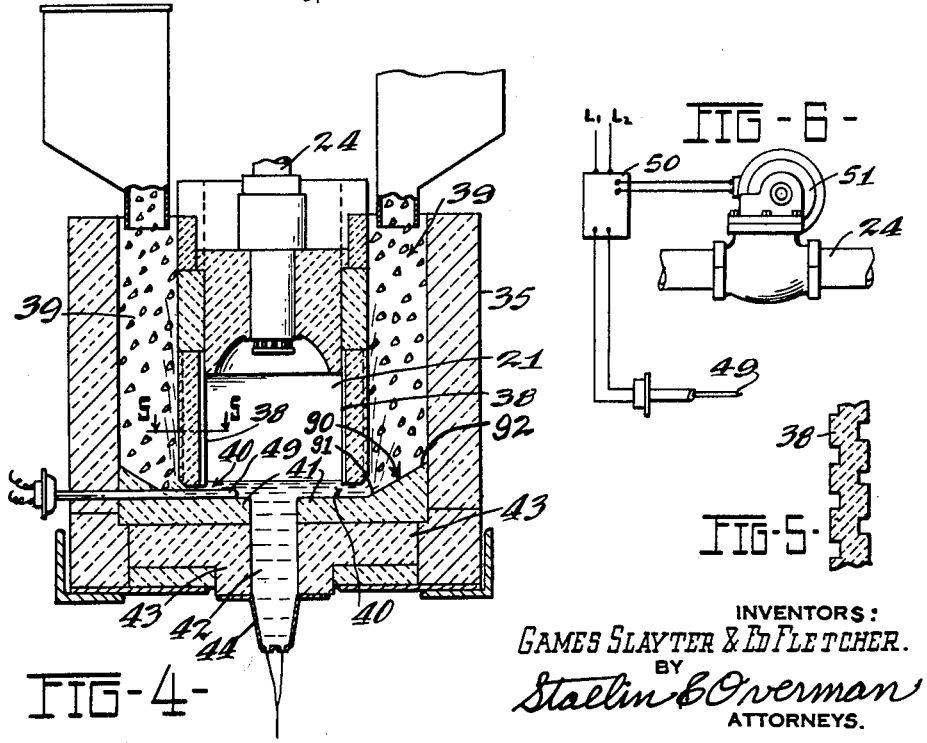
INVENTORS:
GAMES SLAYTER & ED FLETCHER.
BY
Staelin & Overman
ATTORNEYS.

June 30, 1964 G. SLAYTER ETAL 3,139,332
GLASS MELTING APPARATUS
Original Filed Dec. 21, 1955 7 Sheets-Sheet 3
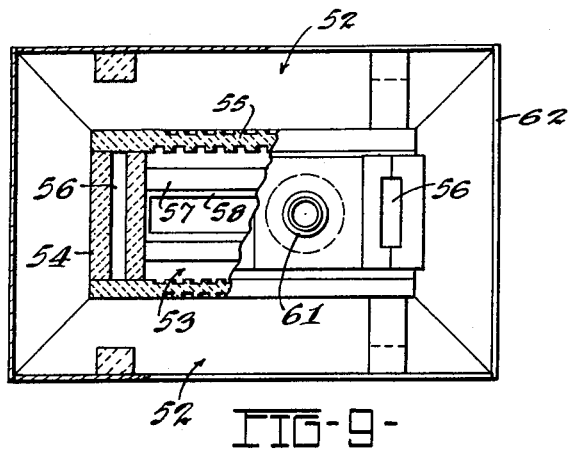
FIG-9-
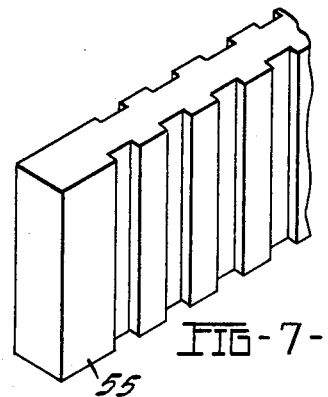
FIG-7-
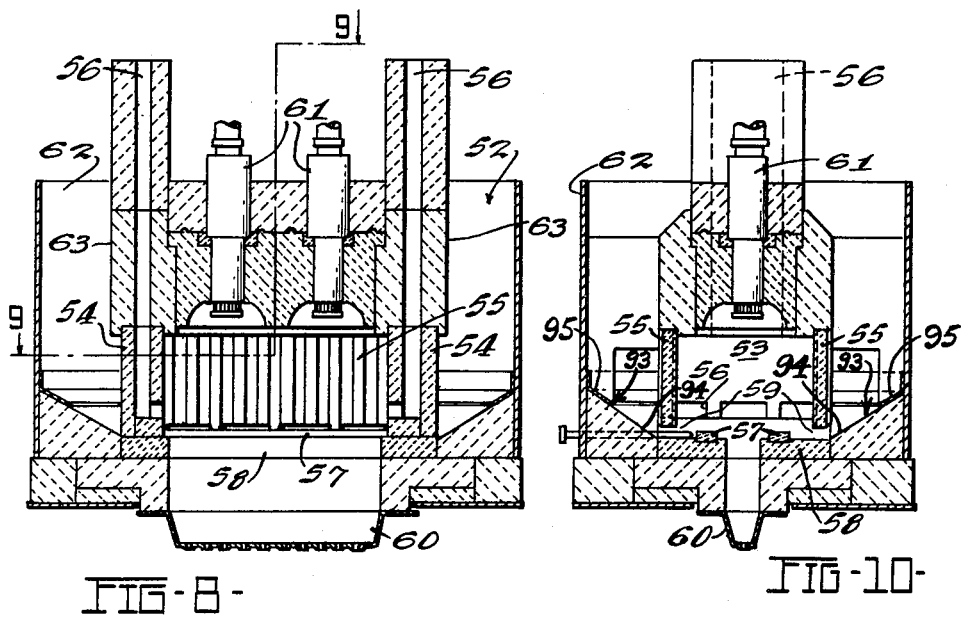
FIG-8- FIG-10-
INVENTORS:
GAMES SLAYTER & ED FLETCHER.
BY
Staelin & Overman
ATTORNEYS.

INVENTOR.
*Games Slayter*
BY *Ed Fletcher*
*Staelin & Overman*
ATTORNEYS

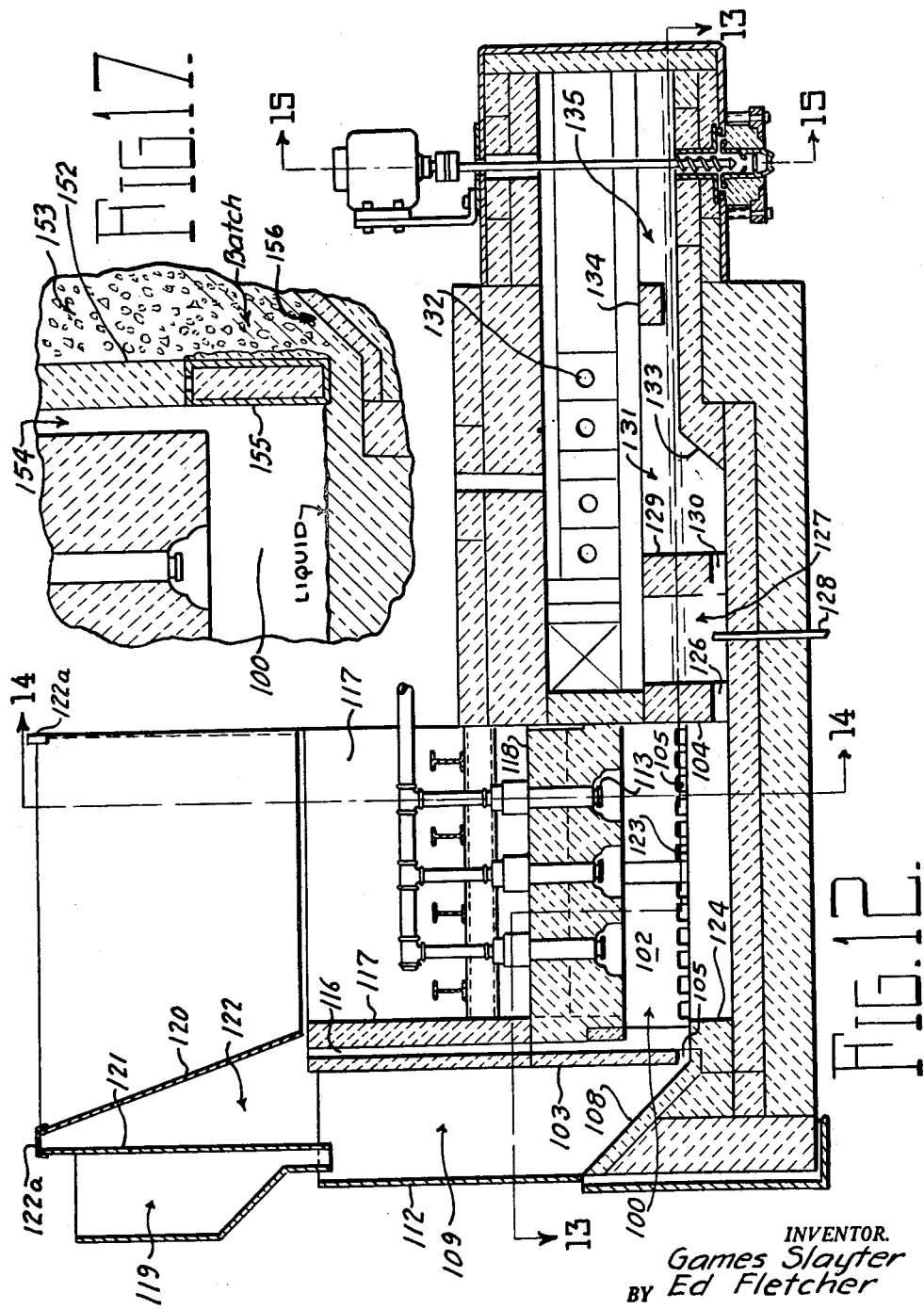

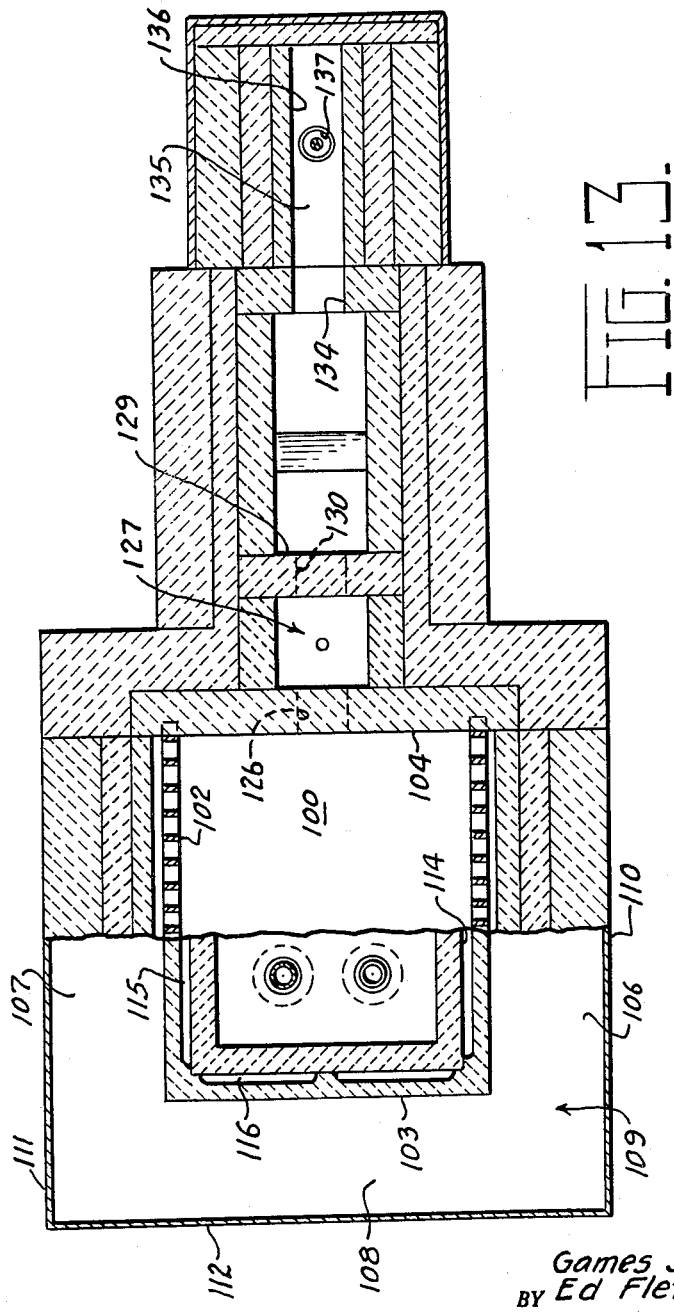

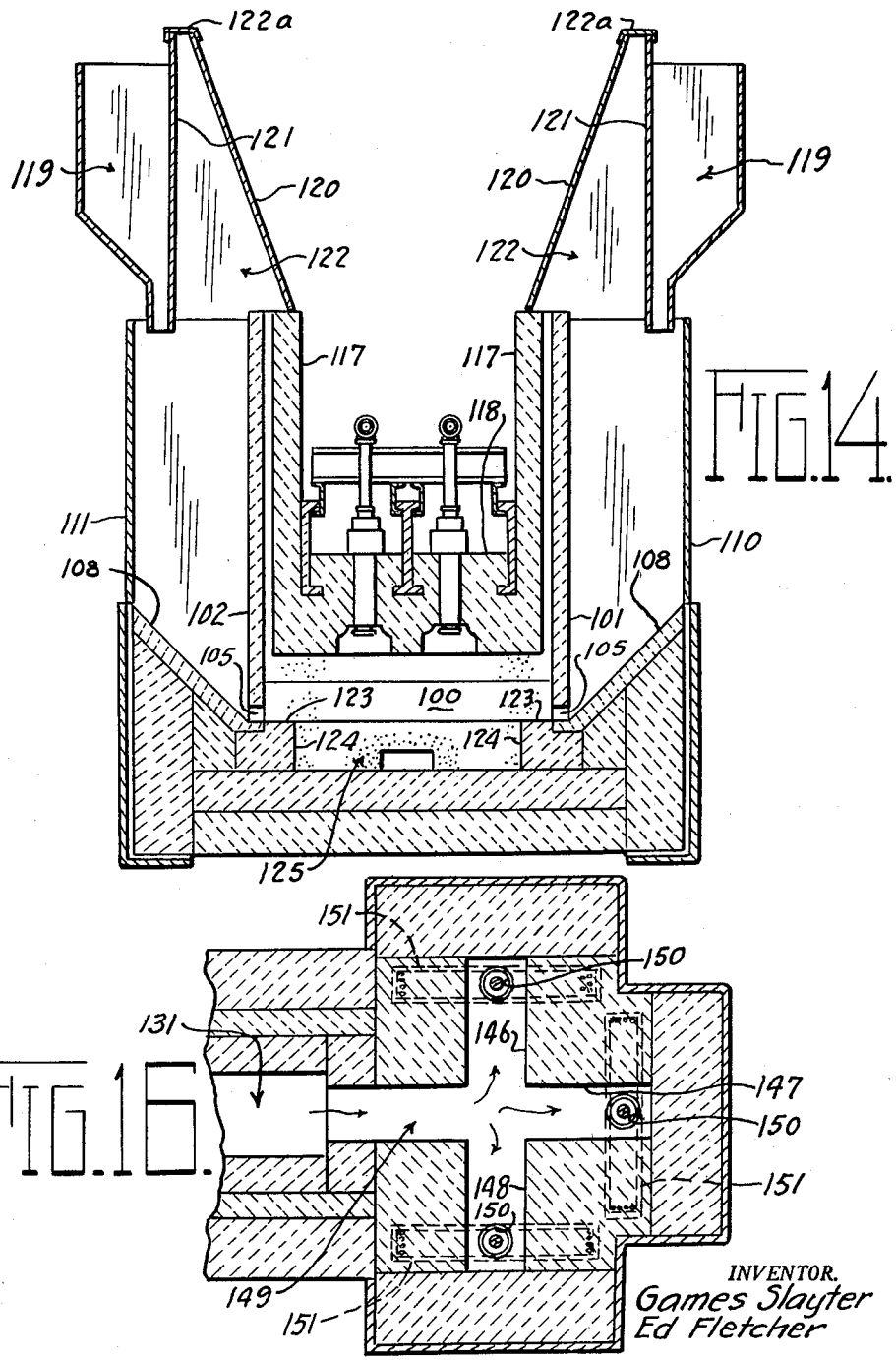

United States Patent Office 3,139,332
Patented June 30, 1964

3,139,332
GLASS MELTING APPARATUS
Games Slayter and Ed Fletcher, Newark, Ohio, assignors to Owens-Corning Fiberglas Corporation, a corporation of Delaware
Continuation of abandoned application Ser. No. 554,566, Dec. 21, 1955. This application Sept. 5, 1961, Ser. No. 135,859
5 Claims. (Cl. 65—325)

This application is a continuation of our copending application Serial No. 554,566, filed December 21, 1955, now abandoned.

This invention relates to small glass melting apparatus and, more particularly, to such apparatus designed for use in connection with the manufacture of fine glass filaments such as those employed in glass fiber strands used in twines and textiles.

Ordinary glass melting tanks are of substantial size and have a heating chamber sufficiently large to maintain a large supply of molten glass into which raw materials can be fed and out of which the molten glass is drawn. The purpose for the maintenance of a large molten pool is to eliminate any large percentile change in overall constituents of the molten glass resulting from any change in the constituents in any particular batch added to the molten pool. Furthermore, by maintaining a large size molten pool and by keeping the glass in the pool for a substantial period of time, the glass is "fined" and cleaned of foreign material, the substantial length of time in the molten state being relied upon to assure the liberation of all of the gases carried into the molten mass by the successive charges of raw material or generated during the combination of the materials added.

The above-mentioned problems and solution to them are well-known in the glass field and, therefore, when glass is to be used in relatively small quantities it has become customary to melt the glass in a large batch and then cool the "fined" glass, forming it in small easily handleable elements, such as marbles, which are then put through a second heating step at the ultimate use point, for example, at the location of the fiber drawing apparatus. Under this system of operation the marble forming step is relied upon for "fining" the glass and removing impurities therefrom and the marbles are fed to the fiber forming apparatus at a rate commensurate with the requirements for such apparatus. This method involves melting the glass twice, once in the original fabrication and once at the final use point.

It is the principal object of this invention to provide glass melting apparatus of small size in which batch or cullet is continuously melted and "fined" and immediately delivered in super-heated condition to the fiber fabricating portion of the apparatus.

It is another object of this invention to provide glass melting apparatus which will melt large quantities of glass in a progressive process as contrasted with a simultaneous process, and which occupies a relatively small space and thus can be directly associated with the fiber forming or similar apparatus.

It is yet another object of this invention to provide glass melting apparatus specifically designed for use with glass fiber forming apparatus which eliminates the present necessity for melting the glass two times and thus substantially decreases the total amount of fuel required for the entire process from batch or cullet to finished glass fibers.

It is a still further object of this invention to provide a small glass melting apparatus capable of a very high output of molten glass in which the heat of exhaust gases emanating from the melter is utilized to pre-heat the glass batch thereby greatly increasing the efficiency of the melter and substantially reducing the cost per ton of molten glass because of the reduction in fuel requirements.

Yet another object of this invention is to provide a unitary glass melter having a high rate of production and high efficiency wherein molten glass may be delivered by the direct melting of glass batch, in quantities sufficient enough to supply a plurality of glass forming apparatuses.

With a unit embodying the invention it is possible to melt glass batch continuously; to immediately use the molten glass in a fiber forming or other operation; and to automatically feed batch or cullet to the apparatus as the supply of molten glass is consumed in the manufacturing process; and yet the entire apparatus is of sufficiently small size that it is economically feasible to provide a separate melting unit for each individual fiber forming station or other manufacturing unit.

The particular invention has great utility in the manufacture of textile glass fibers where, as explained, it has been the practice to first form marbles of fined glass from a large sized melting tank; to cool the marbles; to remelt the marbles in desired quantities and at a controlled rate of feed in a small melting unit of about a foot or so in length and a few inches in width, and to draw the molten glass through a series of bushings or orifices in the bottom of the melting unit. The glass fibers are drawn through these orifices at high rates of speed and usually pass over means for collecting the fibers into a strand, means for applying a binder lubricant coating or the like to the strand and means for winding a strand onto a spool or a drum or otherwise collecting it in packages that can be transported to other locations where processing equipment such as twisters, knitters, looms, etc., are located.

In order to produce a sufficiently large supply of fine glass fibers to represent a commercially economic operation, a substantial number of fiber forming apparatus must be employed and it has heretofore been deemed necessary that, because of space limitations, such apparatus be small enough to occupy no more than, say, 10 or 12 square feet of floor space. In order to achieve this objective it has heretofore been necessary to introduce glass at the fiber forming apparatus in a previously fined condition, i.e., the marbles already described. By the practice of the instant invention, however, the marble forming and remelting steps are eliminated and direct melting of glass cullet and batch at the fiber forming stations is achieved.

These objectives and the method of their realization will be more closely understood from reference to the following specification and to the attached drawings, in which:

FIG. 1 is a relatively diagrammatic drawing, on a small scale, of a fiber forming station.

FIG. 2 is a top plan view of one modification of glass melting apparatus embodying the invention and shown on a slightly larger scale than that employed in FIG. 1.

FIG. 3 is a longitudinal vertical sectional view, on an enlarged scale, of the apparatus shown in FIG. 2 and taken substantially along the line 3—3 of FIG. 2.

FIG. 4 is a transverse vertical sectional view taken on the line 4—4 of FIG. 3.

FIG. 5 is a fragmentary detailed sectional view on an enlarged scale, taken on the line 5—5 of FIG. 4.

FIG. 6 is a schematic wiring diagram illustrating the control of fuel embodied in the apparatus shown in FIGS. 2, 3 and 4.

FIG. 7 is a fragmentary perspective view of a ceramic insulating block, a portion of which is shown in horizontal section in FIG. 5.

FIG. 8 is a vertical sectional view similar to FIG. 3 but on a smaller scale and showing a second modification of the invention.

FIG. 9 is a fragmentary horizontal sectional and plan view, taken substantially on the line 9—9 of FIG. 8.

FIG. 10 is a transverse vertical sectional view taken substantially on the line 10—10 of FIG. 8.

FIG. 12 is a longitudinal vertical sectional view of a glass melting apparatus embodying the invention for the preheating and melting of batch as employed with auxiliary glass fining apparatus.

FIG. 13 is a horizontal sectional view taken along the line 13—13 of FIG. 12.

FIG. 14 is a transverse vertical sectional view on an enlarged scale taken substantially along the line 14—14 of FIG. 13.

FIG. 16 is a fragmentary plan view partly in section showing multiple glass handling or fiber forming stations as employed with the glass melting and fining apparatus of FIGS. 12 and 13.

FIG. 17 is a fragmentary vertical sectional view on an enlarged scale of a portion of a glass melting apparatus embodying the invention and particularly illustrating a modification in the construction of the lower portion of the melting chamber walls.

Figure 15:
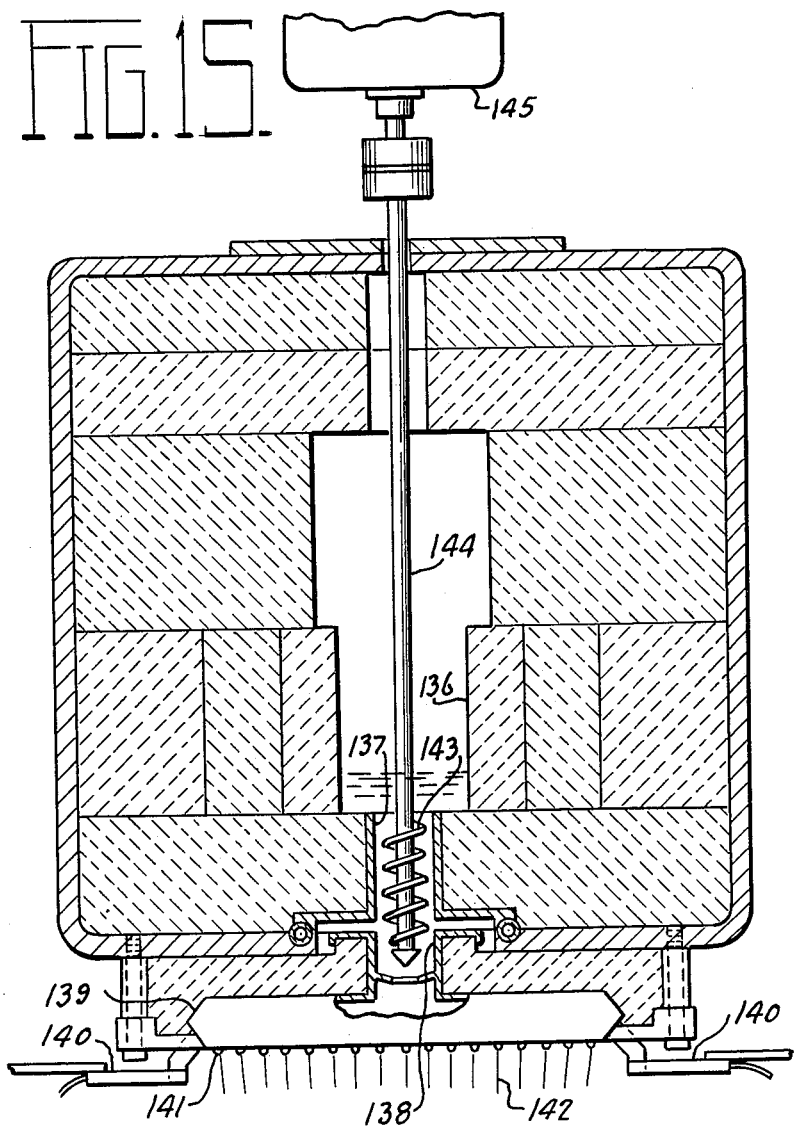
FIG. 15 is a vertical sectional view on an enlarged scale taken substantially along the line 15—15 of FIG. 12.

A glass fiber forming station is illustrated in general in FIG. 1 where an insulated glass melting unit 20 is shown as generally comprising an interior heating chamber 21 equipped, in this case, with two gas burners 22 and 23 supplied from a gas feed line 24 and having an open bottom across which extends a bushing 25. The bushing 25 is provided with a plurality of orifices 26 of such size as to permit molten glass to be drawn therethrough forming individual continuous fibers 27. The apparatus also comprises a gathering wheel 28 for assembling the fibers 27 into a strand 29 and a coating supply means 30 which supplies lubricant, adhesive, or other coating material to the glass fibers 27 as they are formed into the strand 29. The strand is then led over a gathering wheel or pulley 31 driven at a high rate of speed and provided with strand traversing mechanism 32 to lay the strand on the pulley 31 in helical turns thus forming a "package" in the nature of a large spool or bobbin.

As is more completely illustrated in FIGS. 2 through 4 the melting unit 20 comprises, among other parts, a support frame 33 and plate 34 which carry the component parts of the unit. The outer walls of the melting unit 20 consist in relatively heavy blocks of ceramic, heat insulating material 35, the purpose of which is to retain within the unit a very high percentage of all of the heat generated therein. At the interior of the outer blocks 35, and at the ends of the heating unit illustrated in FIGS. 2 through 4, there is located a second layer of ceramic insulating material 36 and an innermost high temperature layer 37. These layers of insulating material 35, 36, 37 are imperforate in the embodiment of the invention shown in FIGS. 2 and 4 and their purpose is solely to retain heat in the interior of the heating chamber 21 of which the ceramic blocks 37 form the end walls.

The side walls of the heating chamber 21 are formed by two parallel, vertically extending refractory walls 38 which are spaced away from outer side walls 35 (as can be more clearly seen in FIG. 4) for the purpose of forming two supply chambers 39 located within the outer walls 35 and outside of the inner combustion chamber walls 38 which refractory walls 38 are common both to the heating chamber 21 and the supply chambers 39.

At the lowermost edges the side walls 38 are provided with a plurality of apertures 40 connecting the supply chambers 39 with the combustion chamber 21. The lower edges of the apertures 40 are formed by ceramic blocks 41 which form the bottom of the heating chamber 21 and are adjacent a well 42 formed by insulating ceramic blocks 43 and a precious metal bushing 44. The bushing 44 has a plurality of very fine orifices 45, each of which serves to form a single glass fiber 27.

It should be noted that the bottom of the heating chamber 21 has at least a horizontal portion which is formed by the bottom blocks 41, that leads from the apertures 40 (which connect the supply chambers 39 and heating chamber 21) and terminates at the downwardly extending well 42 in which molten glass is collected and maintained. The precious metal bushing 44 may also be heated as, for example, by electrical means 46 in order to keep the glass at the proper forming temperature.

The bottoms of the supply chambers 39 are inwardly inclined at 90 (see FIG. 4) both to carry the supply of raw cullet inwardly toward the bottom of the walls 38 adjacent the connecting apertures 40 and to prevent any bridging which might occur were cullet allowed to remain stationary at the bottoms of supply chambers 39 where it would absorb heat and gradually be fused. The lower portions 91 of the inclined bottoms 90 are below the surface of the melted glass and divert molten glass through the apertures 40. The upper portions 92 of the inclined bottoms 90 extend above the surface of the melted glass and direct the cullet toward the walls 38.

The two burners 22 and 23 in the embodiment of the invention shown in FIGS. 2 through 4 are of the "radiant heat" type. The burner apertures are surrounded by generally parabolic radiant heat generated by the burners 22 and 23 downwardly onto the molten glass and onto the walls of the heating chamber 21 as well as through the molten glass flowing on the bottom of the combustion chamber 21 to assure that the glass is uniformly heated and to such a degree that the glass is effectively "fined" before it reaches the bottom of the well 42 whence it is removed in the form of individual glass fibers 27. The heating chamber 21 is provided with a gas escape or pressure relief channel 48, in this embodiment of the invention the channel being located between the burners 22 and 23.

The operation of a glass melting apparatus embodying the invention is as follows: Preferably presintered granulated batch is employed, although other rougher and not presintered batch or cullet may also be used. The batch is fed by gravity into the open upper ends of the supply chambers 39 and fills such chambers, lying closely adjacent the outer surfaces of the common ceramic side walls 38. The gas burners 22 and 23 heat the inner surfaces of the common walls 38 to a temperature in the order of 2800° F. By selection of a proper refractory, for example, a refractory high in chromic oxide, the temperature drop through the walls 38 when made, say, one inch thick, is only in the order of several hundred degrees F. and thus the temperature on the outer surfaces of the common walls 38 is in the neighborhood of 2200 to 2300° F. The glass batch in the supply chambers 39 being of relatively small particle size comes closely into contact with these walls 38 at the temperature of 2200 or 2300° F. and very quickly attains melting temperature so that it flows downwardly along the surfaces of the walls 38 as molten glass in a layer, say ¼" thick, reaching the bottoms of the supply chambers 39 where it is directed through the apertures 40 at the bases of the walls 38 by the lower portions 91 of the inclined surfaces 90. Gravity supplies additional glass batch to replace that melted, there being a secondary layer adjacent the film of molten glass in which the batch is tacky and starting to form a homogeneous mass but which is still fluffy and porous thus allowing most of the combined and free water and the gases to be driven off before the glass reaches the melting temperature. As the glass first softens and then fuses, the particle movement is constantly downward and inward because of the upper portions 92 of the inclined surfaces 90 so that heat penetrating the walls 38 continuously is "wiped down" these walls, being absorbed in melting the batch. The evolving moisture and gases are free to pass off to atmosphere from the top of the open supply chambers 39 which act as chimneys. This absorption of heat is so effective that actual operation reveals that the top of the body of batch in the supply chambers 39 can be touched with a bare hand and the inner surfaces of the outer walls of the supply chamber, i.e., the outside ceramics 35 though only approximately 2½" or so from the outer surfaces of the walls 38, attain a temperature of only approximately 650° F.

As the molten glass passes through the apertures 40 it flows over the generally horizontal ceramic bottoms 41 where it is directly exposed to high temperature heat radiating from the parabolic surfaces 47 to such an extent that remaining gases are forced to escape, "fining" the glass very satisfactorily. The molten glass then flows by gravity into the well 42 and thence into the apertures 45 to form the glass fibers 27.

In order to increase the heat transferral surfaces of the common intervening walls 38, they may be vertically channeled on both sides as shown in FIG. 5 which not only reduces their average thickness to reduce the temperature drop through the walls but also greatly increases their heat transferral surface to increase the efficiency of heat absorption and transfer to the glass batch.

Control of the rates of feeding and melting of the glass in the supply chambers 39 is relatively easily established through the use of a thermocouple 49 which is located on a bottom ceramic 41 and over which molten glass flows. The thermocouple 49 may be connected through the medium of conventional switches 50 to a solenoid or motor operated valve 51 in the gas supply line 24. Thus, if the rate of melting of the glass batch is too rapid and the level of glass in the bottom of the combustion chamber 21 rises, the glass insulates the thermocouple 49 from the radiant heat of the burners 22 and 23 reducing its temperature and so actuating the switches 50 as to close the valve supplying the gas, reducing the heat input to the combustion chamber. Conversely, if the rate of melting of the glass is too slow, the level of the pool of molten glass in the combustion chamber 21 drops, exposing the thermocouple 45 directly to the radiant burners 22 and 23 and increasing its temperature so as to actuate the valve control mechanism 51 to open the supply line 24 and increase the heat input to the combustion chamber 21, thus increasing the rate of melting of the glass.

A glass melting apparatus as just described has been found to produce a glass very free from seeds or bubbles and this result is believed to accrue from the fact that a very thin film of glass flows over the bottom ceramics 41 thus exposing all of the glass being melted to the radiant heat in the chamber 21, driving off the gases, which escape through the pressure relief passageway 48. Because apparatus embodying the present invention provides for only a single melting of the glass (i.e., the original melt and cooling of marbles, for example, being eliminated) substantial savings of fuel are achieved. Since the glass is melted before it enters the precious metal bushing 44, electrical or other heating of the bushing is reduced and indeed, the amount of precious metal necessary for the bushing is greatly reduced since it need not impart as much heat to the molten glass as is required when the heating of the bushing itself is relied upon to melt the previously fined glass such as marbles, as is now the commercial practice.

The modification of the invention illustrated in FIGS. 7 through 10, while incorporating substantially the same elements as those in the modification of the invention already described, provides several modifications of such elements; notably a design such that a supply chamber 52 extends around all four sides of its heating chamber 53 and thus all four walls of the heating chamber 53, viz., the end walls 54 and the side walls 55, all function for heat transmittal to glass batch contained in the supply chamber 52. In this embodiment of the invention the pressure relief channels consist of two passages 56 which are formed in the end walls 54 of the heating chamber 53 and which open into the heating chamber 53 only slightly above the level of molten glass in the chamber. The passages 56 in this modification of the invention also are so designed that they do not open in a straight line between the interior of the heating chamber 53 and the exterior of the glass melting apparatus, a bend in the passageways 56 eliminating radiant dissipation of heat through such passages.

By directing escaping gases through the passages 56, heat is transferred through upper extensions 63 of the chamber and walls 54 from the escaping gases to the batch in the end sections of the supply chamber 52.

A further modification in design consists in the use of a dam block 57 (see FIG. 10, especially), the function of which is to interfere with the flow of molten glass over ceramic blocks 58 forming the bottom of the heating chamber 53 and located between apertures 59 in the common walls 55 and well 60 located at the center bottom of the heating chamber 53. The dam block 57 thus retards the flow of glass over the bottom of the heating chamber 53 and further thins the layer of glass flowing across the generally horizontal top of the dam block further exposing such glass to high temperature radiant heat emanating from burners 61 which function in a manner similar to the burners 22 and 23 in the earlier modification of the invention. As in the modification of the invention shown in FIGS. 2 through 4, that of FIGS. 8 through 10 may employ vertically channeled common walls 55, which are illustrated in larger perspective in FIG. 7, to increase the heat transferral surface and reduce the average thickness of the heat transmitting walls.

As in the earlier modification of the invention this modification of the invention similarly has inclined bottoms indicated at 93 in the supply chamber 52 and functions in substantially the same manner as the modification shown in FIGS. 2 through 4. Lower portions 94 of the inclined bottoms are below the surface of the melted glass behind the dam blocks 57 and divert the melted glass through the apertures 59 while the upper portions 95 extend above the surface of the melted glass to direct the cullet toward the walls 55. It should be noted, however, that by appropriately designing the heating chamber 53 and by selecting the thickness of the heat transmitting common walls 55 in particular, heat can be so effectively absorbed by the downwardly flowing glass cullet as it is melted that, in a glass melting apparatus embodying the invention constructed according to FIGS. 8 through 10, the outermost walls of the supply chamber 52 can consist in very thin insulating material, for example, the dense thin material known as "Transite" and indicated at 62 in FIGS. 8, 9 and 10.

Figure 11:
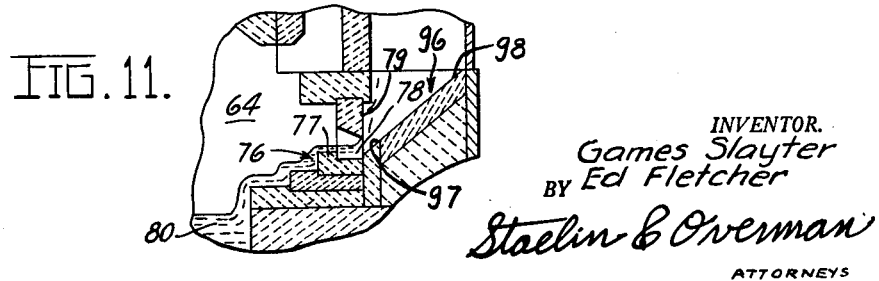
FIG. 11 is a greatly enlarged fragmentary vertical sectional view of a further modification of a portion of an apparatus embodying the invention.

FIG. 11 illustrates still another modification of the construction of apparatus embodying the invention designed to provide an even greater "fining" area without the use of the dam blocks 57 of the construction shown in FIG. 10. In FIG. 11 the bottom area of the heating chamber 64 is formed in a series of steps 76 (there being three shown in FIG. 11) leading directly from a relatively low dam-like lip 77 located just inside connecting passageways 78 formed in the bottom edge of vertical heat transferring walls 79. The steps 76 cause the molten glass to move in a cascade from the openings 78 to a well 80 located at the center bottom of the combustion chamber 64.

The bottom edge of the wall 79 at the openings 78 is beveled to provide for direct exposure of the glass in the openings 78 to the radiant heat from the burners (not shown) at the top of the chamber 64. This has been found to be of help in some cases in preventing the entry of unmelted particles of glass batch into the heating chamber 64.

In common with other modifications of the invention shown earlier, the modification shown in FIG. 11 relies upon the transferral of heat through the walls that are common to the heating chambers and the supply chambers to melt a film of the cullet which then flows down the outer surfaces of the walls and passes through the aperture 78, and thence over the steps 76 en route to the centermost wells 71 and 80, the thin molten film flowing en route to the center wells being directly exposed to radiant heat from radiant burners similar to and located as the burners 61, for example, of FIGS. 8 and 10. Also an inclined surface 96 is used to carry raw cullet toward the wall 79 and divert molten glass through the openings 78. As shown in FIG. 12 a lower portion 97 of the surface 96 is located below the surface of the molten glass while an upper portion 98 extends above the molten glass to direct cullet toward the wall 79.

FIG. 12 shows still another modification of apparatus embodying the invention as combined with a conventional glass refining chamber and in which the fiber forming or glass discharge portions of the apparatus are remote from the glass melting sections of the apparatus. In this embodiment of the invention a melting chamber 100 is formed from a plurality of assembled ceramic blocks comprising side walls 101, and 102, an end wall 103 similar to the side walls 101, 102, and a heavier outlet end wall 104. Each of the side walls 101 and 102 and the end wall 103, has a plurality of apertures 105 at its bottom edge and rests upon the inner lip of the inclined bottom of a batch supply chamber 109 that is formed by blocks 106, 107 and 108, respectively. The walls 101, 102 and 103 form the inner sides of the three-sided supply chamber generally indicated by the reference number 109 and its outer walls are formed by thin plates 110, 111 and 112.

The chamber 109 corresponds to the supply chambers 39 of FIG. 4 and 52 of FIG. 9, serving to maintain a supply of glass batch or ingredients on three sides of the melting chamber 100. The walls 101, 102 and 103 are formed from material capable of transmitting heat from the melting chamber to the batch material in the lower portions of the chamber 109, in the same manner as heat is similarly transmitted in the earlier described embodiments of the invention.

The melting chamber 100 is heated in this embodiment of the invention by six heating means shown as radiant gas burners generally indicated at 113. The chamber 100 has three thin elongated flues 114, 115 and 116 extending upwardly between the chamber walls 101, 102 and 103 and inner frame blocks 117 which form upwardly extending walls erected on a chamber roof block 118 of the furnace.

The melting chamber 100 is thus insulated on three of its sides by the chamber 109. The inner walls of the chamber 109 function as the walls of the melting chamber 100 and also as the outer walls of the flues 114, 115 and 116. Heat from the flues 114, 115 and 116 as well as from the melting chamber 100 is transmitted through the walls 101, 102 and 103 to the glass batch or other ingredients in the chamber 109. This causes melting of the batch on the outer surfaces of the walls 101, 102 and 103 so that the molten glass flows downwardly on these walls whereupon it is diverted through the apertures 105 at the bottoms of the walls into the melting chamber 100 by the inclined bottoms formed by the blocks 108. As in the previously described embodiments the lower portions of the blocks 108 are below the surface of the molten glass to divert the glass through the apertures 105 while the upper portions extend above the molten glass to direct cullet in the chamber 109 toward the walls 101, 102 and 103.

The embodiment of the invention disclosed in FIGS. 12–15 has an additional feature by which the heat of the gases escaping through the flues 114, 115 and 116 is further employed for preheating the glass batch fed into the chamber 109. This feature comprises a three-sided, funnel-like batch supply hopper 119 erected above the chamber 109 and opening downwardly thereinto. A reflector shield 120 cooperates with inner walls 121 of the hopper 119 to form a three section heat chamber generally indicated at 122 into which the flues 114, 115 and 116 open.

As can best be seen in FIGS. 12 and 14, the chamber 122 may be closed or open at its upper end and opens downwardly over the top of the batch chamber 109 and the flues 114, 115 and 116. The bottom of the auxiliary batch hopper 119 also opens into the batch chamber 109. Heated gases flowing out the flues 114–116 first impinge against the shields 120 which reflect some of the heat and radiate some of the heat across the heat chamber 122 to the inner walls 121 of the hopper 119 to preheat the batch therein. Preferably the top of the three sided chamber 122 is open, the gases escaping upwardly between mounting clips 122a.

Glass batch both in the auxiliary hopper 119 and the batch chamber 109 is thus preheated and melted on the outer sides of the walls 101, 102 and 103 before its enters the primary melting chamber 100 through the apertures 105. The glass entering the chamber 100 is thus in condition to be preliminarily "fined" as it flows across a horizontal ledge 123 formed by blocks 124 which define a well 125.

The exit end of the melting chamber 100 is formed by the wall 104 which has a discharge opening in the form of a center glass discharge passage 126 opening at the level of the bottom of the well 125 and leading into a bubbler chamber 127. The bubbler chamber 127 is provided with a bubbler 128 of conventional design to aid in homogenizing the glass flowing through the chamber 127 and its end wall is defined by a weir block 129 having a central passage 130 aligned with the passage 126. The passage 130 communicates with a refining chamber generally indicated at 131 and provided with a plurality of conventional heating elements 132. The bottom of the refining chamber 131 is on the level of the bottom of the bubbler chamber 127 and the well 125. The out flow side of the refining chamber 131 has a dam 133 at a higher level and opens through a skimmer block 134 into a forehearth generally indicated at 135.

In the modification of the invention shown in FIGS. 12–15 the forehearth 135 has a single channel 136 leading to a single tube 137. The tube 137 (see FIG. 15) leads to a neck 138 of a laterally extending "bushing" generally indicated at 139. The bushing 139 is provided with electrodes 140 for connection into an electrical circuit and may be constructed from a suitable resistance heating material such as platinum or a platinum alloy. The bushing 139 has a plurality of fiber forming orifices 141 through which individual fibers 142 are drawn.

In the form of bushing illustrated in FIGS. 12 and 15 a homogenizing and feeding device 143 is shown as extending into the tube 137 and neck 138 and as being driven through its shaft 144 by an electric motor 145 mounted on top of the forehearth structure. The specific bushing 139 and its accessories as shown in FIGS. 12 and 15 does not constitute a part of the instant invention but is illustrative only of a type of glass handling mechanism with which a melting furnace embodying the invention may be provided.

Principally because of the high efficiency resulting from the utilization of almost all of the heat supplied to the melting chamber 100 according to the invention, a relatively small melting chamber 100 is capable of supplying a quantity of molten and refined glass sufficient to operate more than one fiber forming bushing of the type shown in FIG. 15.

FIG. 16 is an illustration of a multiple channel forehearth having three glass channels 146, 147 and 148 fed from a single forehearth 149 leading away from a refining chamber such as the refining chamber 131. Each of the glass channels 146, 147 and 148 may lead to a bushing orifice 150 having its own fiber forming bushing 151.

The apparatus of the invention so absorbs the heat created within the melting chamber 100 that the outer walls 110, 111 and 112 of the chamber 109 and the outer walls of the auxiliary batch hopper 119 are sufficiently cool for contact by the hand of an operator. The apparatus of the invention thus eliminates the necessity for extensive insulation around the exterior of the batch hoppers. Because this represents a differential in temperature of over 2000° F. between the temperature present in the interior of the melting chamber 100 and the temperature of the outer walls of the chamber 109 and hopper 119, it is apparent that the apparatus of the invention constitutes a highly efficient furnace utilizing a very great percentage of the heat input. By concentrating the heat present in the melting chamber 100 of this embodiment of the invention to the problem of glass melting as its principal objective, and by further refining the glass in the refining chamber 131, an extremely high "throughput" may be achieved in a relatively small and compact structure.

FIG. 17 illustrates a modification of the lower ends of the heat transmitting walls of the heating chamber 100. In this modification a wall 152 which forms the inner wall of an adjacent batch supply chamber 153, the outer wall of a gas escape flue 154 and a side wall of the heating chamber 100 is jacketed at its lower end in a thin envelope 155 formed from a temperature and abrasion resistant material such as a noble metal or an alloy containing noble metal. The supply chamber 153 also has an inclined bottom 156 the lower portion of which is below the surface of the molten glass (liquid) as shown in FIG. 17 to divert the molten glass beneath the envelope 155. The upper portion of the inclined bottom 156 is above the molten glass surface to direct the batch toward the wall 152.

Platinum or platinum alloys are most efficient for the envelope 155 since they are most nearly inert to the ingredients present in glass batch and are least harmed by the abrasive effect of the molten and semimolten glass at the temperatures employed within the furnace. The jacketing, as with the envelope 155, is most helpful at the lower ends of the heat transmitting walls such as the wall 152 because the lower ends of the wall 152 define the most restricted spaces through which the molten glass and fused batch material must move at the highest temperature. By the addition of this improvement to any of the modifications of the invention previously disclosed the life of the furnace at this critical point is substantially increased.

We claim:

1. Glass melting apparatus comprising, in combination, a closed top heating chamber having a generally flat bottom and a centrally located well of smaller area than said bottom and which extends downwardly from said bottom, a vertically extending open topped granulated batch material supply chamber adjacent one side of said heating chamber, a common vertical wall intervening between said chambers said common wall having connecting passageways therein between said chambers at the bottom of said supply chamber and at a level above said well, said wall being capable of conducting heat from said heating chamber to said supply chamber of sufficient intensity to fuse a portion of said batch material in said supply chamber adjacent said wall, said supply chamber having a bottom inclined toward said passageways for carrying said batch toward said wall, and a high temperature heat source located in and for providing heat directly to said heating chamber only, whereby such batch material is continuously melted in said supply chamber against said common wall and continuously flows downwardly thereon to and through said passageways into said heating chamber and thence to said well.

2. Glass melting apparatus comprising, in combination, a closed top heating chamber having a generally flat bottom, a vertically extending open topped glass batch material supply chamber adjacent said heating chamber, a vertical wall common to said chambers and having connecting passageways therebetween at the lower edge thereof at the bottom of said supply chamber, said wall being capable of conducting heat from said heating chamber to said supply chamber of sufficient intensity to fuse said glass batch material in said supply chamber adjacent said wall, said bottom of said heating chamber having a downwardly directed discharge opening therein and a generally horizontal bottom portion over which molten glass flows en route to said discharge opening, a high temperature heat source in the upper portion of said heating chamber for providing heat directly to said chamber, a gas escape port communicating with said heating chamber only at a level above said passageways, and means in said bottom of said supply chamber for carrying said glass batch material toward said common wall, whereby said material is continuously melted against said common wall and continuously flows downwardly thereon to and through said passageways and over the bottom of said heating chamber to said discharge opening.

3. In glass melting apparatus, in combination, a refractory heating chamber having a generally horizontal bottom surface and a downwardly extending discharge well therein at least two supply chambers for containing particulate glass batch material located exteriorly adjacent said heating chamber, a vertical heat transmitting wall for each of said supply chambers extending between and common to the respective one of said supply chambers and said heating chamber, said walls having passageways at the bottoms of said supply chambers leading from said supply chambers into said heating chamber for flow of molten glass thereinto, the bottoms of said supply chambers being inclined inwardly toward said passageways, an upper portion of each of said inclined bottoms extending above the level of said passageways for carrying said particulate glass batch material toward the respective heat transmitting wall, a radiant heat source in said heating chamber, and temperature responsive means adjacent the bottom of said heating chamber in the flow path of said molten glass from said passageways for controlling the heat input to said radiant heat source for controlling the rate of melting of said particulate glass batch material and thereby maintaining the rate of flow of said molten glass to said discharge well.

4. Apparatus for melting glass forming materials comprising, in combination, a heating chamber, an open topped vertically extending glass batch material chamber laterally adjacent said heating chamber, a common wall for separating said heating chamber and said material chamber, said common wall having an inner surface defining one side of said heating chamber and an outer surface defining the inner side of said material chamber and being formed of a material capable of transmitting heat applied to its inner surface in sufficient intensity to fuse the glass forming materials adjacent its outer surface, said common wall having openings therethrough from said supply chamber at the level of the bottom of said supply chamber to said heating chamber for the passage of molten glass formed by the fusing of said glass forming materials, said heating chamber having a generally horizontal bottom surface no higher than the level of said openings and a downwardly extending well below the level of said openings, a radiant heat source in said heating chamber spaced upwardly from said bottom for heating said molten glass, flowing from said openings and an inwardly inclined bottom on said supply chamber, a portion of said inclined bottom being above the level of said openings for carrying said glass forming materials to said outer surface of said common wall.

5. Glass melting apparatus comprising, in combination, a closed top heating chamber having a bottom, the bottom of said heating chamber having a downwardly extending well and a discharge opening in said well and including a generally horizontal portion over which molten glass flows en route to the discharge opening, a gas escape passage extending vertically upward from said heating chamber at one side thereof and at a level above said horizontal portion, an open topped glass batch supply chamber having an inner wall common with at least said gas escape passage and a bottom inclined inwardly toward said heating chamber, said supply chamber extending upwardly beyond said heating chamber, there being at least one passageway between said chambers at the lower edge of said wall at the level of the lower side of the bottom of said supply chamber, said wall being capable of transmitting heat from said heating chamber and from gases escaping through said gas escape passage to said supply chamber of sufficient intensity to fuse glass batch in said supply chamber adjacent said common wall, said gas escape passage including upwardly extending walls for reflecting and radiating heat from said gases to said common wall at a level above the level of said heating chamber, and a high temperature heat source in the upper portion of said heating chamber for providing heat directly to said chamber whereby said glass batch material is continuously melted in said supply chamber against said common wall and continuously flows down said common wall to and through said openings and across said bottom of said heating chamber into said well.

References Cited in the file of this patent

UNITED STATES PATENTS

| | | |
|---|---|---|
| 823,757 | Betz | June 19, 1906 |
| 1,421,210 | Good | June 27, 1922 |
| 1,760,371 | Morton | May 27, 1930 |
| 2,262,069 | Turk | Nov. 11, 1941 |